(12) United States Patent
Ohtsu et al.

(10) Patent No.: US 7,616,852 B2
(45) Date of Patent: Nov. 10, 2009

(54) OPTICAL SUBSTRATE, OPTICAL WAVEGUIDE, AND OPTICAL WAVEGUIDE SUBSTRATE

(75) Inventors: Shigemi Ohtsu, Kanagawa (JP); Toshihiko Suzuki, Kanagawa (JP); Akira Fujii, Kanagawa (JP); Kazutoshi Yatsuda, Kanagawa (JP); Keishi Shimizu, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/043,171

(22) Filed: Mar. 6, 2008

(65) Prior Publication Data

US 2008/0279504 A1    Nov. 13, 2008

(30) Foreign Application Priority Data

May 9, 2007  (JP)  ............................. 2007-124660
May 9, 2007  (JP)  ............................. 2007-124661

(51) Int. Cl.
*G02B 6/30* (2006.01)

(52) U.S. Cl. ......................................... 385/48; 385/88

(58) Field of Classification Search ................... 385/14, 385/31, 38, 52, 129, 48, 88
See application file for complete search history.

(56) References Cited

U.S. PATENT DOCUMENTS 5,299,276 A * 3/1994 Okamura et al. ............ 385/130
6,234,687 B1 * 5/2001 Hall et al. .................... 385/88

FOREIGN PATENT DOCUMENTS

| JP | 2001-188146 A | 7/2001 |
| JP | 2004-286895 A | 10/2004 |
| JP | 2006-91684 A | 4/2006 |

* cited by examiner

*Primary Examiner*—Sarah Song
(74) *Attorney, Agent, or Firm*—Sughrue Mion, PLLC

(57) ABSTRACT

An optical substrate includes: a submount; a planar optical element which is mounted on the submount; a pair of positioning members which are disposed at an interval across the planar optical element on the submount; an optical waveguide in which a core and a clad are formed by a flexible material; and a holding member which holds the optical waveguide to allow a tip end of the optical waveguide to be inserted between the pair of positioning members, and the optical waveguide to be bent to extend parallel to the submount.

9 Claims, 9 Drawing Sheets

OPTICAL SUBSTRATE, OPTICAL WAVEGUIDE, AND OPTICAL WAVEGUIDE SUBSTRATE

CROSS-REFERENCE TO RELATED APPLICATIONS

This application is based on and claims priority under 35 USC 119 from Japanese Patent Application No. 2007-124660 filed on May 9, 2007 and Japanese Patent Application No. 2007-124661 filed on May 9, 2007.

BACKGROUND

1. Technical Field

The present invention relates to an optical substrate, an optical waveguide, and an optical waveguide substrate.

2. Related Art

As a conventional art, known is an optical waveguide substrate configured by: an optical waveguide in which a mirror surface having an angle of 45 degrees to the optical axis is disclosed in one end portion; a substrate in which the optical waveguide is disposed; a planar optical element which has a light emitting portion, and which is disposed on the substrate; and a flexible optical waveguide in which an end portion with a mirror surface having an angle of 45 degrees to the optical axis, and another end portion where a core is exposed are disposed (for example, see JP-A-2001-188146).

The optical waveguide is disposed so that the end portion having the mirror surface is directed toward the inner side of the substrate, and the other end is directed toward the outer side of the substrate. In the substrate, a groove is disposed at a position corresponding to the mirror surface.

An external force is applied to the flexible optical waveguide, so that the whole length of the waveguide is bent. The end portion where the core is exposed is caused to directly butt against the light emitting portion of the planer optical element, and bonded thereto. The end portion with the mirror surface is inserted into the groove disposed in the substrate, and optically connected to an end portion with a mirror surface in another optical waveguide.

SUMMARY

It is an object of the invention to propose an optical substrate in which, even when mounted on a submount while bending an optical waveguide, the mounting height can be suppressed to a small value.

According to an aspect of the invention, there is provided an optical substrate including: a submount; a planar optical element which is mounted on the submount; a pair of positioning members which are disposed at an interval across the planar optical element on the submount; an optical waveguide in which a core and a clad are formed by a flexible material; and a holding member which holds the optical waveguide to allow a tip end of the optical waveguide to be inserted between the pair of positioning members, and the optical waveguide to be bent to extend parallel to the submount.

It is another object of the invention to propose an optical waveguide and optical waveguide substrate in which, even when a bent portion is provided, the optical loss is small.

According to an aspect of the invention, there is provided an optical waveguide wherein the optical waveguide has a core, and a clad which is disposed around the core, has a numerical aperture of from 0.25 to 0.45, and includes a bent portion which holds a predetermined radius of curvature in a state where no external force is applied.

BRIEF DESCRIPTION OF THE DRAWINGS

Exemplary embodiments of the present invention will be described in detail based on the following figures, wherein.

DESCRIPTION OF REFERENCE NUMERALS AND SIGNS

1 . . . optical substrate, 2A, 2B, 2C . . . submount, 3 . . . polymer optical waveguide film, 4A, 4B . . . light emitting element, 5A, 5C . . . light receiving element, 6A, 6B . . . adhesive agent, 20A to 20D, 20a to 20d . . . fixing member, 21A . . . V-groove, 21A to 21D, 21a to 21f . . . groove, 22a to 22c . . . pad, 23a to 23c . . . wire, 30 . . . clad, 31a . . . first core, 31b . . . second core, 32A, 32B, 32C . . . bent portion, 40 . . . light emitting portion, 41 . . . pad, 50 . . . light receiving portion, 51 . . . pad, 200 . . . adjusting member, 300 . . . optical fiber, 7 . . . heating member, 8 . . . supporting member, 9 . . . work table

DETAILED DESCRIPTION

First Exemplary Embodiment

Figure 1A:
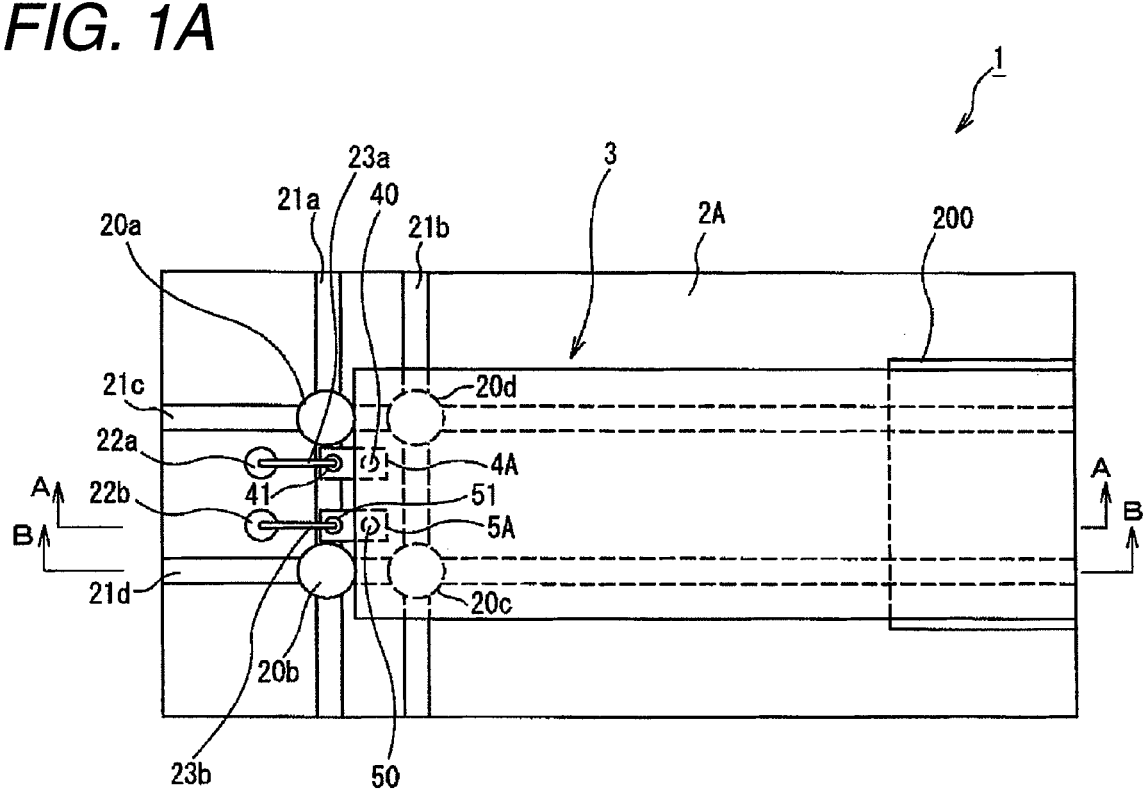
FIG. 1A is a plan view of an optical substrate of first and fourth exemplary embodiments.
Figure 1B:
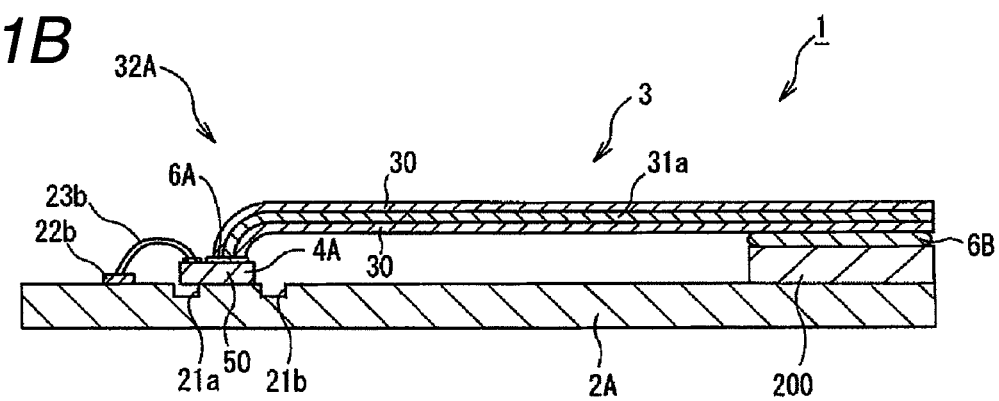
FIG. 1B is a section view taken along the line A-A in FIG. 1A.
Figure 1C:
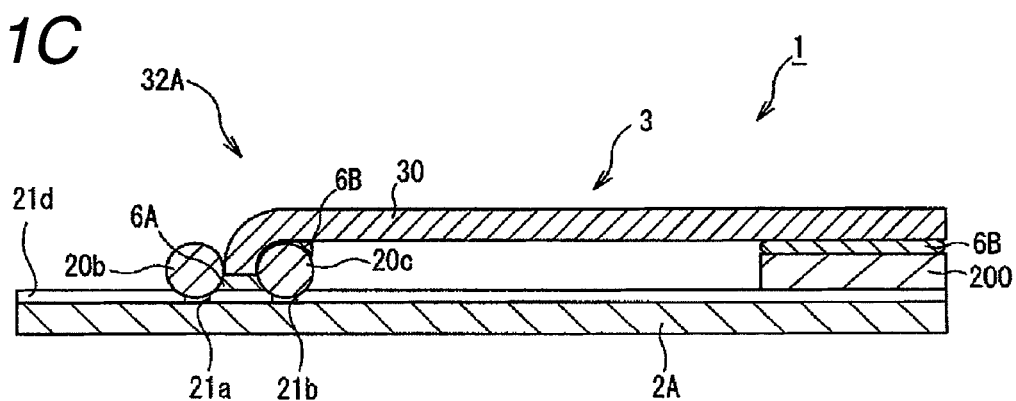
FIG. 1C is a section view taken along the line B-B in FIG. 1A.

FIGS. 1A, 1B and 1C are diagrams of an optical substrate of a first exemplary embodiment of the invention in which FIG. 1A is a plan view of the optical substrate, FIG. 1B is a section view taken along the line A-A in FIG. 1A, and FIG. 1C is a section view taken along the line B-B in FIG. 1A. The figure is a conceptual diagram, and the dimensions of the parts do not relate to the scale of the figure.

The optical substrate 1 functioning as an optical waveguide substrate has a submount 2A which is to be mounted on an electronic circuit substrate (not shown) including various electronic components, components of a power source circuit, etc. On the submount 2A, the followings components are placed: a polymer optical waveguide film 3 which is an optical component formed by a flexible material; a light emitting element 4A which is a planar optical element that converts a driving signal transmitted from an electronic component on the electronic circuit substrate, and that outputs an optical signal; a light receiving element 5A which is a planar optical element that converts a received optical signal to an electrical signal; fixing members 20a, 20d and 20b, 20c which are a pair of positioning members having a spherical shape; and a height-adjusting member 200 which adjusts the mounting height of the polymer optical waveguide film 3, and which holds the polymer optical waveguide film 3 via an adhesive agent 6B so that the polymer optical waveguide film 3 extends parallel to the submount 2A.

(Submount)

Figure 2A:
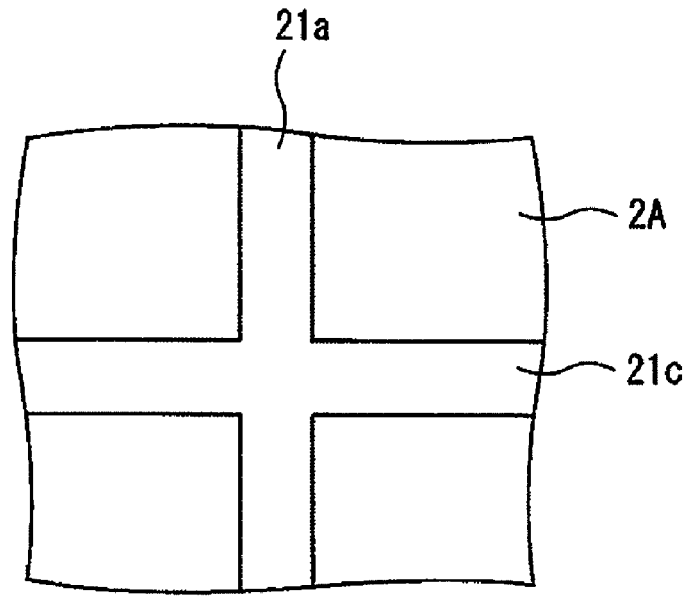
FIG. 2A is a plan view of an intersection of grooves in the first and fourth exemplary embodiments of the invention.
Figure 2B:
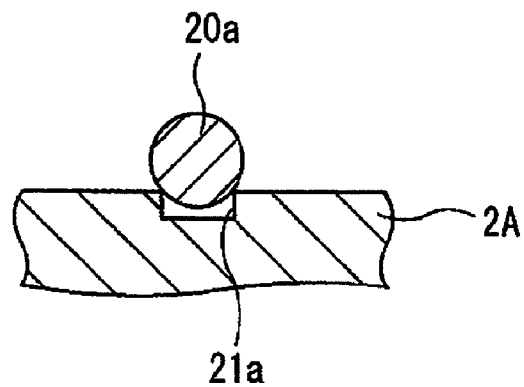
FIG. 2B is a section view of the grooves in the first and fourth exemplary embodiments of the invention.
Figure 2C:
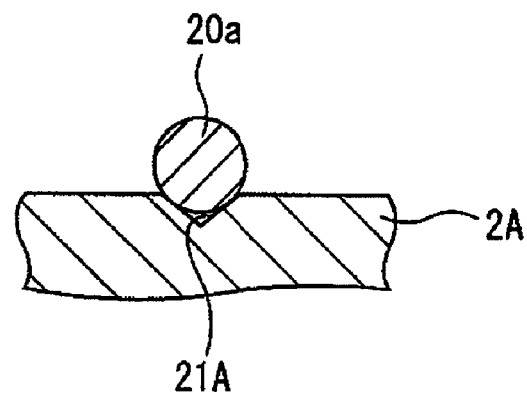
FIG. 2C is a section view of a V-groove in the first exemplary and fourth embodiments of the invention.

FIG. 2A is a plan view of an intersection of grooves in the first exemplary embodiment of the invention, FIG. 2B is a section view of the grooves in the first exemplary embodiment of the invention, and FIG. 2C is a section view of a V-groove in the first exemplary embodiment of the invention.

The submount 2A has a rectangular shape. As shown in FIGS. 1A and 2A, a pair of grooves 21a, 21b and 21c, 21d which are formed in a recessed shape are disposed in the upper face so as to intersect with each other. As the material, for example, a metal such as Si, Ni, or Cu, glass, a plastic such as acrylic or polycarbonate, or the like is used. The submount 2A is not restricted to have a rectangular shape, and may have a polygonal shape or a circular shape, or any shape.

As shown in FIG. 2B, the grooves 21a to 21d in the submount 2A are formed in a recessed shape by cutting with a dicing saw so that, for example, the interval between the grooves 21a, 21b is 450 µm, that between the grooves 21c, 21d is 300 µm, the width is 300 µm, and the depth is 300 µm.

In the submount 2A comprising the grooves 21a to 21d, in place of the above-described method using a dicing saw, for example, a method using RIE (Reactive Ion Etching) or photolithography which is usually employed may be used for forming the grooves.

As shown in FIG. 2C, for example, the grooves 21a to 21d may have a V-like shape. Alternatively, the grooves may have a U-like shape, a semicircular shape, or another shape, or a shape in which these shapes are combined to each other. Namely, the grooves may have any shape.

In the exemplary embodiment, as shown in FIG. 1A, pads 22a, 22b are disposed on the submount 2A. Alternatively, pads may not be disposed on the submount 2A, and wires may be directly connected from the electronic circuit substrate to a pad 41 of the light emitting element 4A and a pad 51 of the light receiving element 5A. In the case where the submount 2A is electrically conductive, wiring may be performed directly on the pads 41, 51, or an insulator may be interposed between the pads 22a, 22b and the submount 2A.

(Fixing Member)

The fixing members 20a to 20d have, for example, a spherical shape of a diameter of 350 µm. As the material, for example, a metal such as Si, Ni, or Cu, glass, a plastic such as acrylic or polycarbonate, or the like is used. As shown in FIG. 2A, the fixing member 20a is placed at an intersection between the grooves 21a, 21c, the fixing member 20b is placed at an intersection between the grooves 21a, 21d, the fixing member 20c is placed at an intersection between the grooves 21b, 21d, and the fixing member 20d is placed at an intersection between the grooves 21b, 21c.

As shown in FIG. 2A, each of the fixing members 20a to 20d is supported by four edges formed in the corresponding intersection, and fixed to the submount 2A. The fixing member may be embedded so that the lower face is in contact with the bottom face of the corresponding one of the grooves 21a to 21d, thereby fixing the fixing member. Alternatively, the fixing members 20a to 20d may be fixed to the grooves 21a to 21d by using an adhesive agent such as an epoxy adhesive. The fixing members 20a to 20d are not restricted to have a spherical shape, and may have a columnar shape or a polygonal shape, or any shape.

(Polymer Optical Waveguide Film)

Figure 3:
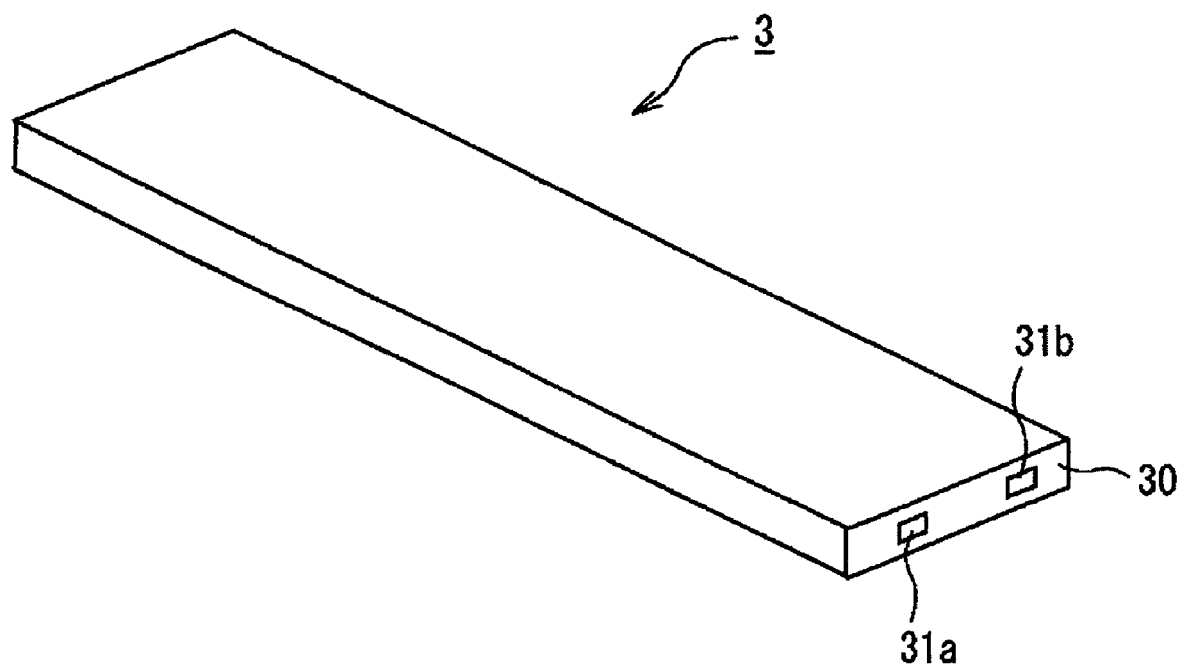
FIG. 3 is a perspective view of a polymer optical waveguide film of the first exemplary embodiment of the invention.

FIG. 3 is a perspective view of the polymer optical waveguide film of the first exemplary embodiment of the invention. For example, the polymer optical waveguide film 3 has a thickness of 100 µm, and a glass transition temperature of 100 to 200° C., and, as shown in FIG. 3, the section shape is a rectangle which elongates in the film length direction. The polymer optical waveguide film 3 is configured by first and second cores 31a, 31b having a thickness of, for example, 50 µm, and a clad 30 which surrounds the first and second cores 31a, 31b, and which has a thickness of, for example, 25 µm. When the polymer optical waveguide film 3 is mounted on the submount 2A, as shown in FIGS. 1B and 1C, a bent portion 32A is formed, and the film is fixed by adhesive agents 6A, 6B to the height-adjusting member 200, etc.

In order to reduce the bending loss, preferably, the NA (Numerical Aperture) of the polymer optical waveguide film 3 is 0.25 to 0.45, and, more preferably, 0.35 to 0.45. When the NA is expressed by using the refractive index difference, it is preferable to set the refractive index difference between the first and second cores 31a, 31b and the clad 30, to 1% to 5% from the viewpoint of the optical loss in the bent portion 32A. More preferably, the refractive index difference is 3% to 5%. In the case where the refractive index difference is 3%, for example, the optical loss can be made equal to or less than 0.1 dB even when the radius of curvature is 1.5 mm. In the case where the refractive index difference is 4%, the optical loss can be made equal to or less than 0.1 dB even when the radius of curvature is 1 mm.

(Production of Polymer Optical Waveguide Film)

The polymer optical waveguide film 3 can be produced by a method using RIE (Reactive Ion Etching) or photolithography which is usually employed. For example, the polymer optical waveguide film 3 in the exemplary embodiment can be efficiently produced by the following steps (1) to (6):

(1) a step of preparing a mold in which recesses that are formed by a cured layer of a curable resin for forming a mold, and that correspond to core projections of the optical waveguide, and two or more through holes respectively communicating with the one and other ends of each of the recesses are disposed;

(2) a step of closely contacting a clad-forming flexible film substrate having excellent adhesiveness to the mold, with the mold;

(3) a step of filling the through holes in the one ends of the recesses of the mold with which the clad-forming flexible film substrate is closely contacted, with a core-forming curable resin, and performing vacuum-suction on the other ends of the recesses of the mold to fill the recesses of the mold with the core-forming curable resin;

(4) a step of curing the filled core-forming curable resin, and separating the mold from the clad-forming flexible film substrate;

(5) a step of forming a clad layer on the clad-forming flexible film substrate on which the cores are formed; and (6) a step of forming an end face of the polymer optical waveguide film by a dicing saw.

In accordance with the application of the optical elements, the material of the clad-forming flexible film substrate is selected in consideration of optical characteristics such as the refractive index and the optical transparency, the mechanical strength, the heat resistance, the adhesiveness to the mold, and the flexibility. Examples of the film are a cycloaliphatic acrylic resin film, a cycloaliphatic olefin resin film, a cellulose tri-acetate film, an epoxy resin film, and a fluorine-containing resin film. The thickness of the film substrate is suitably selected in consideration of the flexibility, the rigidity, the easiness of handling, and the like. Usually, the film substrate preferably has a thickness of about 0.02 to 0.1 mm.

As the core-forming curable resin, a resin such as a radiation curable resin, an electron beam curable resin, or a heat-curable resin can be used. Particularly, a UV-curable resin and a heat-curable resin are preferable. As the core-forming UV- or heat-curable resin, for example, a UV- or heat-curable monomer or oligomer, or a mixture of the monomer and the oligomer is preferably used. As the UV-curable resin, for example, an epoxy, polyimide, or acrylic UV-curable resin is preferably used. The refractive index of a cured member of the core-forming curable resin must be larger than that of the film substrate which will be formed as the clad.

As the clad-forming curable resin, for example, a UV-curable resin or a heat-curable resin is preferably used, and a UV- or heat-curable monomer or oligomer, or a mixture of the monomer and the oligomer is used. From the viewpoint of confinement of light, it is preferable to set the refractive index of the clad to be equal to that of the film substrate.

In the method of producing the polymer optical waveguide film 3, the production steps are very simplified, and a polymer optical waveguide film can be easily produced. As compared with a conventional method of producing the polymer optical waveguide film 3, therefore, the polymer optical waveguide film 3 can be produced with a very low cost. Although the method is simple, the optical loss of the obtained polymer optical waveguide film 3 is reduced, and the film is highly accurate and can be freely mounted on various apparatuses.

(Light Emitting Element)

As the light emitting element 4A, for example, plural light emitting elements (planar optical elements) such as a planar light emitting diode or a planer laser can be used. In the exemplary embodiment, a VCSEL (planer laser) is used as the light emitting element 4A.

In the planer laser, for example, an n-type upper reflective layer, an active layer, a current constriction layer, a p-type lower reflective layer, a p-type contact layer, and a p-type electrode are formed on an n-type GaAs substrate, and an n-type electrode is formed on the front side of the n-type GaAs substrate.

The light emitting element 4A has a configuration where the pads 41, 22a are electrically connected to each other through a wire 23a, and the pad 22a is to be electrically connected to a circuit pattern of the electronic circuit substrate on which the submount 2A is to be mounted.

(Light Receiving Element)

As the light receiving element 5A, for example, a planar optical element such as a planar photodiode can be used. In the exemplary embodiment, a GaAs PIN photodiode which has a high responsibility is used as the light receiving element 5A.

For example, the light receiving element 5A comprises, on a GaAs substrate, P, I, and N layers which are joined by PIN junction, a p-type electrode which is connected to the P layer, and an n-type electrode which is connected to the N layer.

The light receiving element 5A has a configuration where the pads 51, 22b are electrically connected to each other through a wire 23b, and the pad 22b is to be electrically connected to a circuit pattern of the electronic circuit substrate on which the submount 2A is to be mounted.

As shown in FIG. 1B, a light receiving portion 50 of the light receiving element 5A is optically coupled to the first core 31a of the polymer optical waveguide film 3 via the transparent adhesive agent 6A, and a light emitting portion 40 of the light emitting element 4A is optically coupled to the second core 31b of the polymer optical waveguide film 3 via the transparent adhesive agent 6A.

The light emitting element 4A and the light receiving element 5A are arranged between the grooves 21c, 21d at a pitch of, for example, 250 μm.

(Adhesive Agent)

As the adhesive agent 6A, a light-curable resin such as a UV-curable resin, a heat-curable resin, or the like can be used. In order to suppress the optical loss, it is preferable to use a material having the same refractive index as the first and second cores 31a, 31b of the polymer optical waveguide film 3. As the adhesive agent 6B which is used for fixing the polymer optical waveguide film 3, the fixing members 20a to 20d, and the height-adjusting member 200, for example, an epoxy adhesive agent is used.

(Mounting of Polymer Optical Waveguide Film)

In the thus-produced polymer optical waveguide film 3, the adhesive agent 6A is applied to a light input/output end which is on the side of mounting. Then, the adhesive agent 6B is applied to the fixing members 20c, 20d and the height-adjusting member 200. The light input/output end to which the adhesive agent 6A is applied is inserted between the pair of fixing members 20a, 20d and 20b, 20c, and the polymer optical waveguide film 3 is bent while being contacted with parts of the surfaces of the fixing members 20c, 20d, thereby forming the bent portion 32A having a radius of curvature which is similar to the radii of curvature of the fixing members 20c, 20d. In order to hold the bent portion 32A, the polymer optical waveguide film 3 in which the bent portion 32A is formed is fixed to the submount 2A via the adhesive agents 6A, 6B by the fixing members 20a to 20d and the height-adjusting member 200. After the fixation of the polymer optical waveguide film 3, the optical elements 4A, 5A and the fixing members 20a to 20d are sealed by a sealant, and the optical substrate 1 in which the mounting height is lowered is obtained.

Operation of First Exemplary Embodiment

Hereinafter, the operation of the optical substrate of the first exemplary embodiment of the invention will be described with reference to FIGS. 1 to 3.

(Transmission and Reception of Optical Signal)

The light emitting element 4A of the submount 2A receives the driving signal that is used for driving the light emitting element 4A, and that is transmitted from the electronic circuit substrate on which the submount 2A is mounted, through the pad 22a, the wire 23a, and the pad 41. The light emitting element 4A outputs an optical signal based on the received driving signal, to cause the optical signal to propagate through the polymer optical waveguide film 3.

The direction of the optical path for the optical signal propagating through the polymer optical waveguide film 3 is changed by the core of the bent portion 32A from the direction perpendicular to the surface of the submount 2A to that parallel to the surface of the submount 2A. For example, the optical signal is received by a light receiving element (not shown) through an optical connector (not shown) disposed on the other end portion of the polymer optical waveguide film 3, to be converted to an electrical signal, and then transmitted to a predetermined electronic circuit.

Second Exemplary Embodiment

Figure 4A:
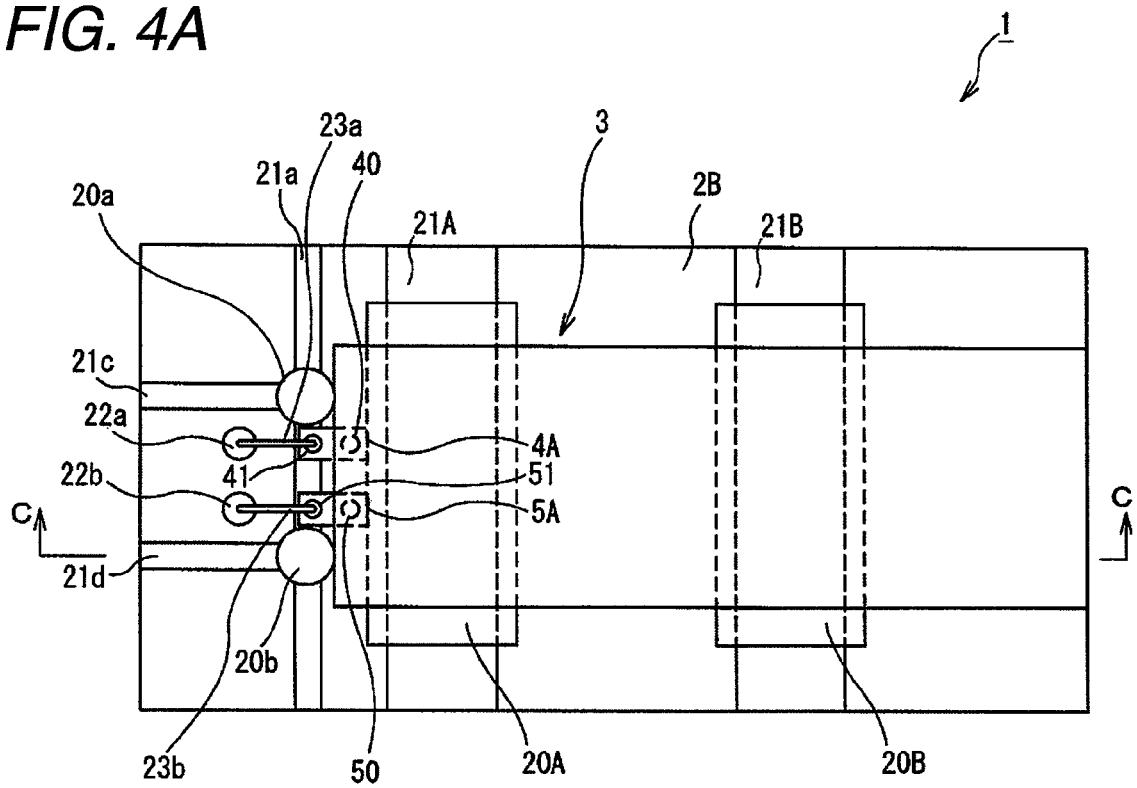
FIG. 4A is a plan view of an optical substrate of a second exemplary embodiment of the invention.
Figure 4B:
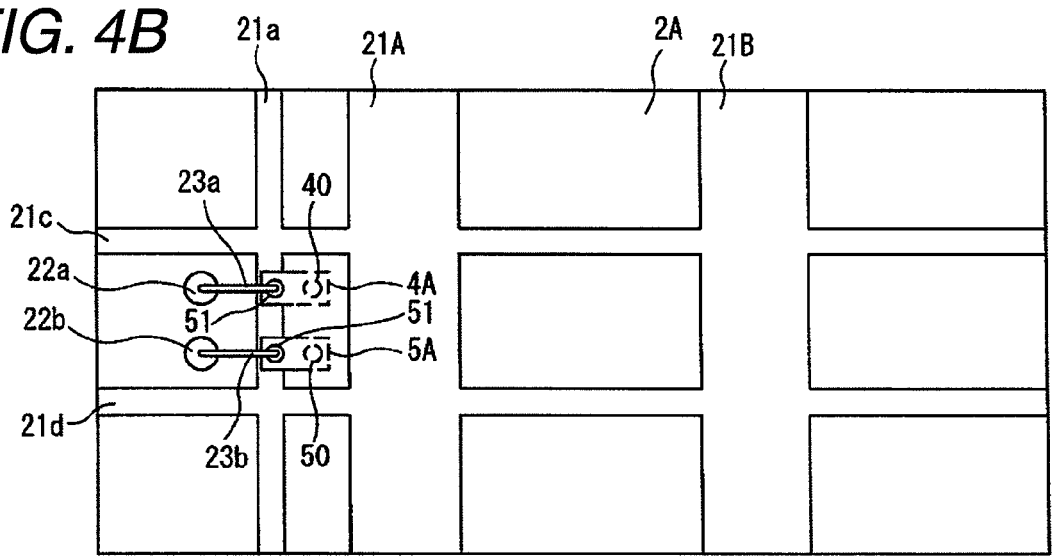
FIG. 4B is a section view of a submount.
Figure 4C:
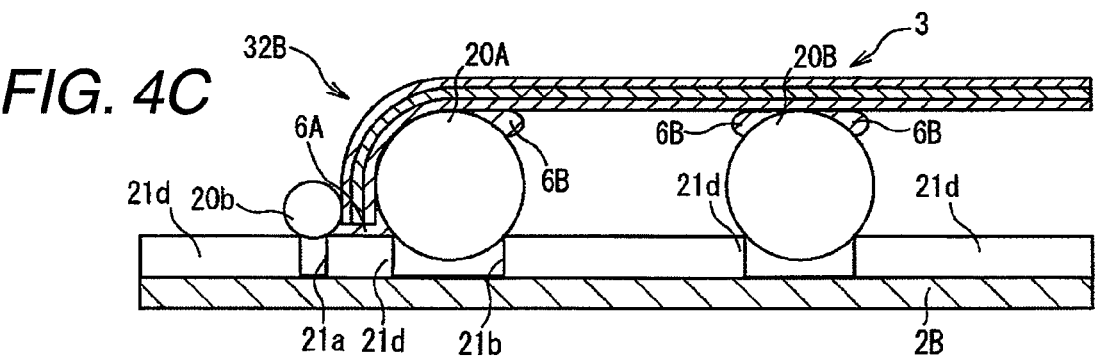
FIG. 4C is a section view taken along the line C-C in FIG. 4A.

FIGS. 4A, 4B and 4C are diagrams of an optical substrate of a second exemplary embodiment of the invention in which FIG. 4A is a plan view of the optical substrate, FIG. 4B is a section view of a submount, and FIG. 4C is a section view taken along the line C-C in FIG. 4A. The figure is a conceptual diagram, and the dimensions of the parts do not relate to the scale of the figure. In the following description, components having the same configuration and function as those of the first exemplary embodiment are denoted by the common reference numerals.

In the first exemplary embodiment, the grooves 21a to 21d having the same width and depth are disposed in the submount 2A. In the second exemplary embodiment, as shown in FIGS. 4A and 4B, a pair of grooves 21A, 21B which have an increased width, and which are formed parallel to each other are disposed in the submount 2B in place of the groove 21b, and columnar fixing members 20A, 20B are placed on the submount 2B in place of the fixing members 20d, 20c and the height-adjusting member 200. The other configuration is identical with the first exemplary embodiment.

The fixing members 20A, 20B have a columnar shape. As the material of the members, for example, a metal such as Si, Ni, or Cu, glass, a plastic such as acrylic or polycarbonate, or the like is used.

(Mounting of Polymer Optical Waveguide Film)

In the polymer optical waveguide film 3, the adhesive agent 6A is applied to the light input/output end which is on the side of mounting. Then, the adhesive agent 6B is applied to the fixing members 20A, 20B. The light input/output end to which the adhesive agent 6A is applied is inserted between the fixing members 20a, 20A and 20b, 20A, and the polymer optical waveguide film 3 is bent while being contacted with a part of the surface of the fixing member 20A, thereby forming the bent portion 32A having a radius of curvature which is similar to the radius of curvature of the fixing member 20A. The polymer optical waveguide film 3 in which the bent portion 32A is formed holds the bent portion 32A, and therefore is fixed to the submount 2B via the adhesive agents 6A, 6B by the fixing members 20a, 20b, 20A, 20B. After the fixation of the polymer optical waveguide film 3, the optical elements 4A, 5A and the fixing members 20a, 20b, 20A are sealed by a sealant, and the optical substrate 1 in which the mounting height is lowered is obtained.

Third Exemplary Embodiment

Figure 5A:
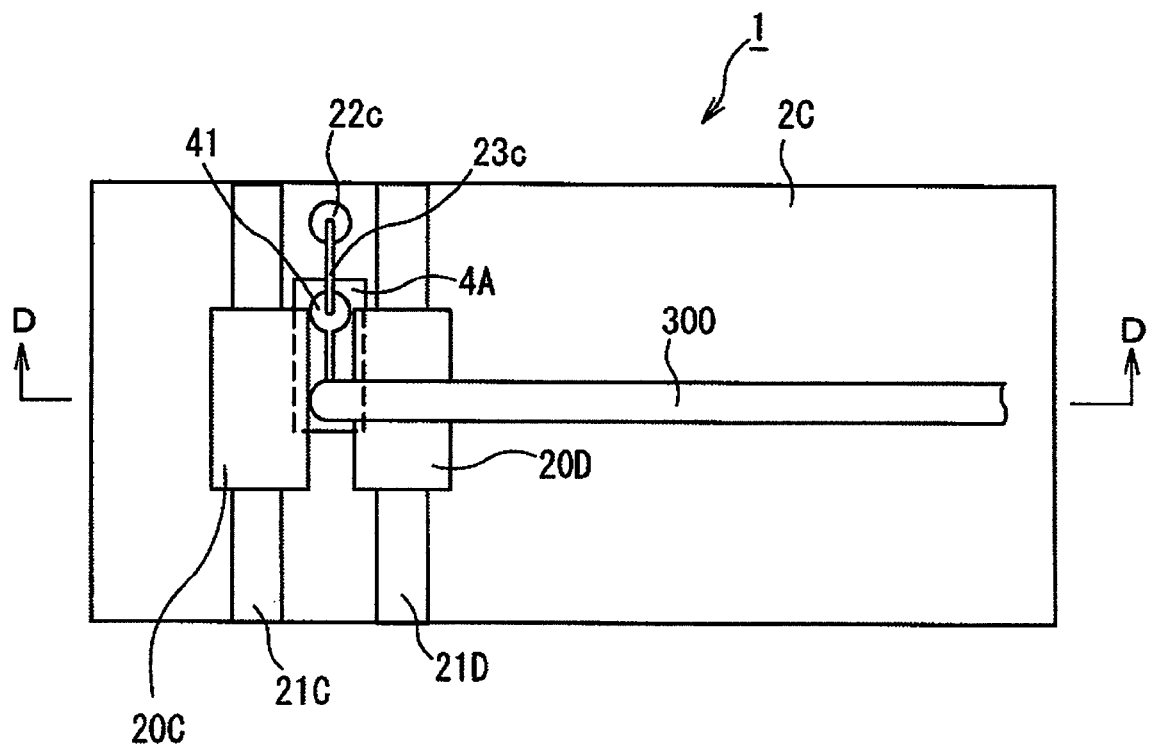
FIG. 5A is a plan view of an optical substrate of a third exemplary embodiment of the invention.
Figure 5B:
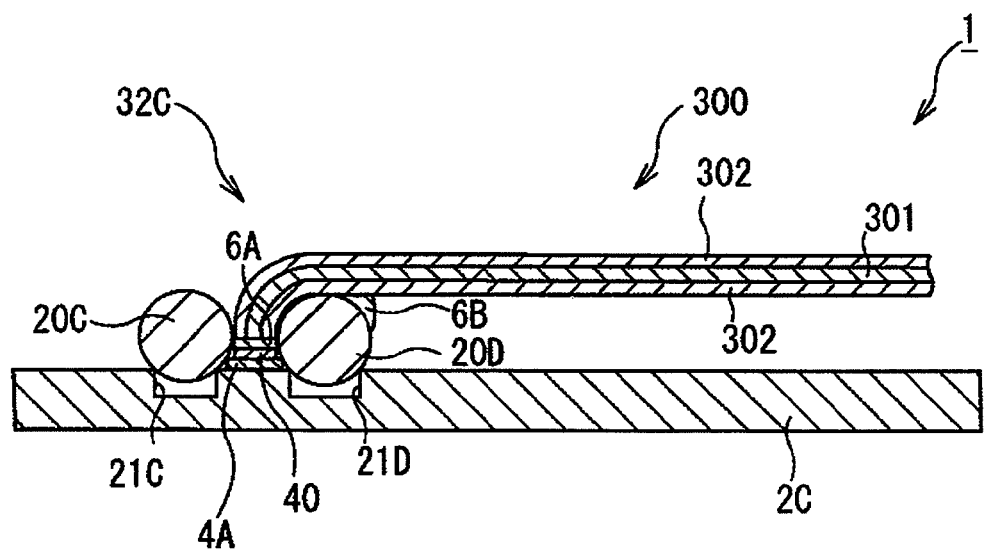
FIG. 5B is a section view taken along the line D-D in FIG. 5A.

FIGS. 5A and 5B are diagrams of an optical substrate of a third exemplary embodiment of the invention in which FIG. 5A is a plan view, and FIG. 5B is a section view taken along the line D-D in FIG. 5A. The figure is a conceptual diagram, and the dimensions of the parts do not relate to the scale of the figure.

The optical substrate 1 has a submount 2C which is to be mounted on an electronic circuit substrate (not shown) including various electronic components, components of a power source circuit, etc. A light emitting element 4A which converts a driving signal transmitted from an electronic component on the electronic circuit substrate, to output an optical signal, fixing members 20C, 20D having, for example, a columnar shape, and an optical fiber 300 are placed on the submount 2C.

(Submount)

The submount 2C has a rectangular shape, and comprises a pair of grooves 21C, 21D which are formed in a recessed shape in the upper face. As the material of the submount 2C, for example, a metal such as Si, Ni, or Cu, glass, a plastic such as acrylic or polycarbonate, or the like is used. In the submount 2C, the grooves 21C, 21D having, for example, a width of 300 μm, a depth of 300 μm, and a pitch of 100 μm are formed in its surface by a dicing saw.

(Fixing Member)

The fixing members 20C, 20D have a columnar shape, and are made of a metal, glass, a plastic such as acrylic or polycarbonate, or the like. Alternatively, the fixing members may have a spherical shape or a semicircular shape. The shape is not particularly restricted.

(Optical Fiber)

The optical fiber 300 has a diameter of, for example, 100 μm, and is made of the same materials as the polymer optical waveguide film 3 in the first exemplary embodiment. The optical fiber is configured by a core 301 having a circular section shape, and a clad 302 which is formed around the core 301.

(Mounting of Optical Fiber)

In the optical fiber 300, the adhesive agent 6A is applied to the light input/output end which is on the side of mounting. Then, the adhesive agent 6B is applied to the fixing member 20D. The light input/output end of the optical fiber 300 to which the adhesive agent 6A is applied is inserted between the fixing members 20C, 20D, and the optical fiber is bent while being contacted with a part of the surface of the fixing member 20D, whereby a bent portion 32C having a radius of curvature which is similar to that of the fixing member 20D is formed in the optical fiber 300. The optical fiber 300 is fixed to the submount 2C via the adhesive agents 6A, 6B by the fixing members 20C, 20D. After the fixation of the optical fiber 300, the optical element 4A and the fixing members 20C, 20D are sealed by a sealant.

(Transmission and Reception of Optical Signal)

The light emitting element 4A disposed on the submount 2C receives the driving signal transmitted from the electronic circuit substrate on which the submount 2C is mounted, through the pad 22a, a wire 23c, and the pad 41. The light emitting element 4A outputs an optical signal based on the received driving signal, to cause the optical signal to propagate through the optical fiber 300.

The direction of the optical path for the optical signal propagating through the optical fiber 300 is changed by the bent portion 32C from the direction perpendicular to the surface of the submount 2C to that parallel to the surface of the submount 2C. The optical signal is received by a light receiving element (not shown) through an optical connector (not shown) disposed on the other end portion of the optical fiber 300, to be converted to an electrical signal, and then transmitted to a predetermined electronic circuit.

Fourth Exemplary Embodiment

Figure 6A:
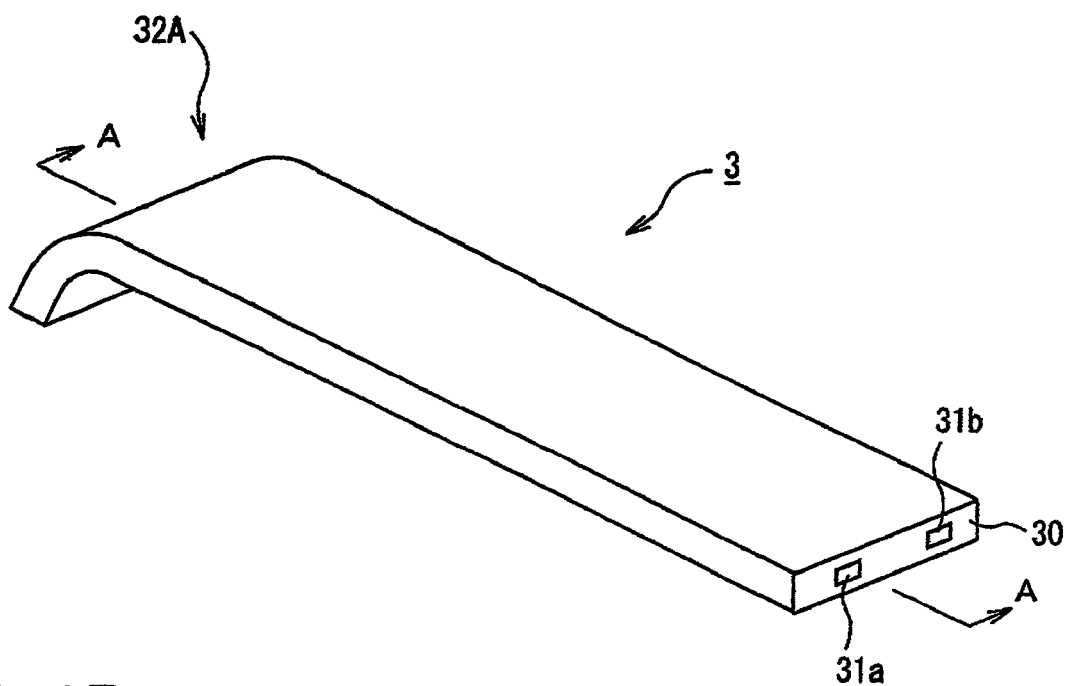
FIG. 6A is a perspective view of a polymer optical waveguide film.
Figure 6B:
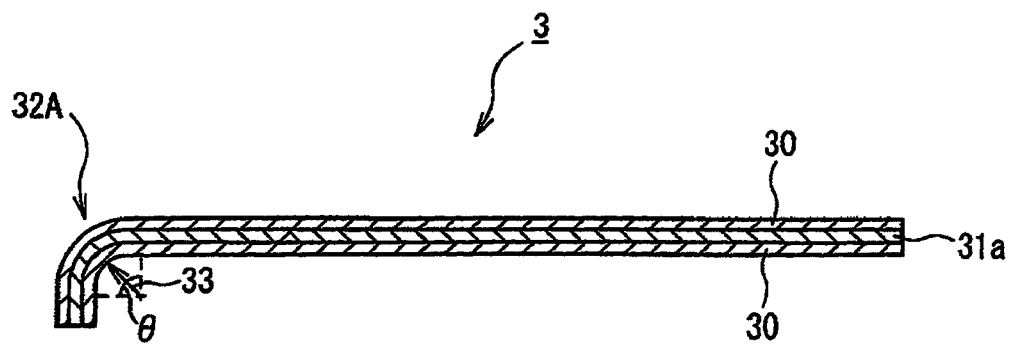
FIG. 6B is a section view taken along the line C-C in FIG. 6A.

FIGS. 1A, 1B and 1C are diagrams of an optical substrate of a fourth exemplary embodiment of the invention, and FIGS. 6A and 6B are perspective views of an optical waveguide film of the fourth exemplary embodiment of the invention. FIG. 1A is a plan view of the optical substrate, FIG. 1B is a section view taken along the line A-A in FIG. 1A, and FIG. 1C is a section view taken along the line B-B in FIG. 1A. FIG. 6A is a perspective view of a polymer optical waveguide film, and FIG. 6B is a section view taken along the line C-C in FIG. 6A.

The optical substrate 1 functioning as an optical waveguide substrate has a submount 2A which is to be mounted on an electronic circuit substrate (not shown) including various electronic components, components of a power source circuit, etc. On the submount 2A, the followings components are placed: the polymer optical waveguide film 3 which is formed by a thermoplastic resin; a light emitting element 4A which converts a driving signal transmitted from an electronic component on the electronic circuit substrate, and which outputs an optical signal; a light receiving element 5A which converts a received optical signal to an electrical signal; fixing members 20a, 20b, 20c, 20d which have, for example, a spherical shape; and a height-adjusting member 200 which adjusts the height when the polymer optical waveguide film 3 is mounted.

(Submount)

The submount 2A has a rectangular shape, and, in the upper face, has U-grooves 21a, 21b, 21c, 21d which are formed in a U-like shape. As the material, for example, a metal such as Si, Ni, or Cu, glass, a plastic such as acrylic or polycarbonate, or the like is used.

In the exemplary embodiment, as shown in FIG. 1A, pads 22a, 22b are disposed on the submount 2A. Alternatively, pads may not be disposed on the submount 2A, and wires may be directly connected from the electronic circuit substrate to a pad 41 of the light emitting element 4A and a pad 51 of the light receiving element 5A. In the case where the submount 2A is electrically conductive, wiring may be performed directly on the pads 41, 51, or an insulator may be interposed between the pads 22a, 22b and the submount 2A.

(Fixing Member)

FIG. 2A is a plan view of an intersection of the U-grooves in the fourth exemplary embodiment of the invention, FIG. 2B is a section view of the intersection of the U-grooves in the fourth exemplary embodiment of the invention, and FIG. 2C is a section view of a V-groove in the fourth exemplary embodiment of the invention.

As shown in FIG. 2A, the fixing member 20a is placed at an intersection between the U-grooves 21a, 21c, the fixing member 20b is placed at an intersection between the U-grooves 21a, 21d, the fixing member 20c is placed at an intersection between the U-grooves 21b, 21d, and the fixing member 20d is placed at an intersection between the U-grooves 21b, 21c.

As shown in FIGS. 2A and 2B, each of the fixing members 20a to 20d is supported by four edges formed in the corresponding intersection, and fixed to the submount 2A. The fixing member may be embedded so that the lower face is in contact with the bottom face of the corresponding one of the grooves 21a to 21d, thereby fixing the fixing member. Alternatively, the fixing members 20a to 20d may be fixed to the grooves 21a to 21d by using an adhesive agent such as an epoxy adhesive.

The fixing members 20a to 20d are not restricted to have a spherical shape, and may have a columnar shape, or any shape. The material is not restricted to glass, and may be and not limited to a metal or a plastic.

As shown in FIG. 2C, for example, the U-grooves 21a, 21b, 21c, 21d may have a V-like shape. Alternatively, the grooves may have a semicircular shape, or another shape, or a shape in which these shapes are combined to each other. Namely, the grooves may have any shape.

(Polymer Optical Waveguide Film)

For example, the polymer optical waveguide film 3 has a thickness of 100 μm, and a glass transition temperature of 100 to 200° C., and, as shown in FIG. 6A, the section shape is a rectangle which elongates in the film length direction. As shown in FIG. 6B, the film is configured by first and second cores 31a, 31b having a thickness of, for example, 50 μm, and a clad 30 which surrounds the first and second cores 31a, 31b, and which has a thickness of, for example, 25 μm. In the polymer optical waveguide film 3, a bent portion 32A having a constant radius 33 of curvature is formed, and the both end portions are formed so as to be 90 degrees to the optical axis of the polymer optical waveguide film 3.

In order to reduce the bending loss, preferably, the NA (Numerical Aperture) of the polymer optical waveguide film 3 is 0.25 to 0.45, and, more preferably, 0.35 to 0.45. The glass transition temperature of the polymer optical waveguide film 3 is preferably 100° C. or higher, and, more preferably, 100 to 200° C. When the NA is expressed by using the refractive index difference, it is preferable to set the refractive index difference between the first and second cores 31a, 31b and the clad 30, to 1% to 5% from the viewpoint of the optical loss in the bent portion 32A. More preferably, the refractive index difference is 3% to 5%. In the case where the refractive index difference is 3%, for example, the optical loss can be made equal to or less than 0.1 dB even when the radius of curvature is 1.5 mm. In the case where the refractive index difference is 4%, the optical loss can be made equal to or less than 0.1 dB even when the radius of curvature is 1 mm.

The bent portion 32A is formed so that, when an angle from the light input/output end of the polymer optical waveguide film 3 to the end of the bending is indicated by θ as shown in FIG. 6B, θ in the exemplary embodiment is 90 degrees. In the case where, for example, an error of 10 degrees is produced in θ and the bent portion is formed to have θ=80 degrees, gaps are formed between the light emitting portion 40 of the light emitting element 4A and the light receiving portion 50 of the light receiving element 5A, and the polymer optical waveguide film 3. However, the polymer optical waveguide film 3 has a large NA, and hence the connecting loss can be suppressed to a level equivalent to that of the case where θ is 90 degrees, by using the adhesive agent 6A, a gel, or the like.

As the adhesive agent 6A, a light-curable resin such as a UV-curable resin, a heat-curable resin, or the like can be used. In order to suppress the optical loss, it is preferable to use a material having the same refractive index as the first and second cores 31a, 31b of the polymer optical waveguide film 3. As the adhesive agent 6B which is used for fixing the polymer optical waveguide film 3 and the fixing members, for example, an epoxy adhesive agent is used.

(Production of Polymer Optical Waveguide Film)

The polymer optical waveguide film 3 can be produced in the same manner as that in the first exemplary embodiment.

(Formation of Bent Portion)

Figure 7A:
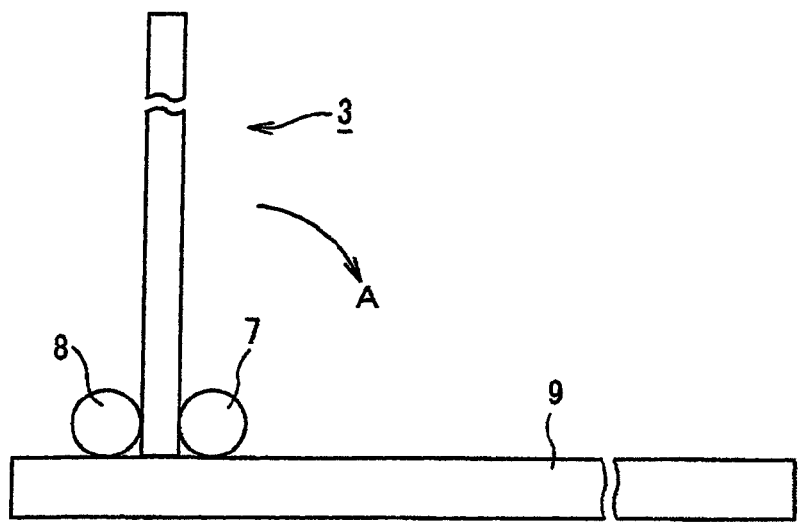
FIGS. 7A, 7B, and 7C are diagrams relating to formation of a bent portion in the fourth exemplary embodiment of the invention.
Figure 7B:
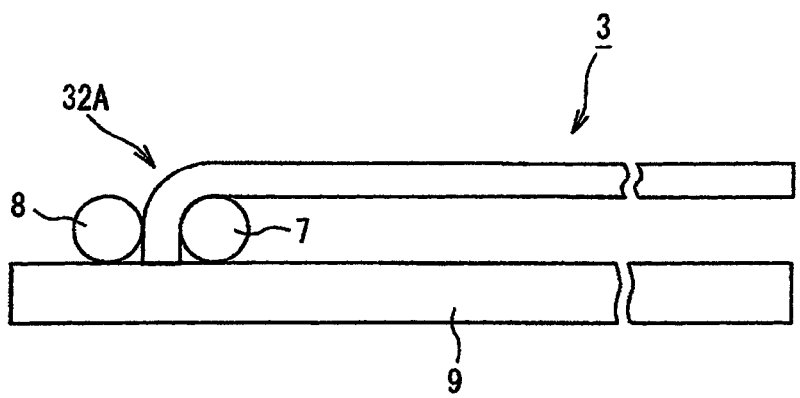
Figure 7C:
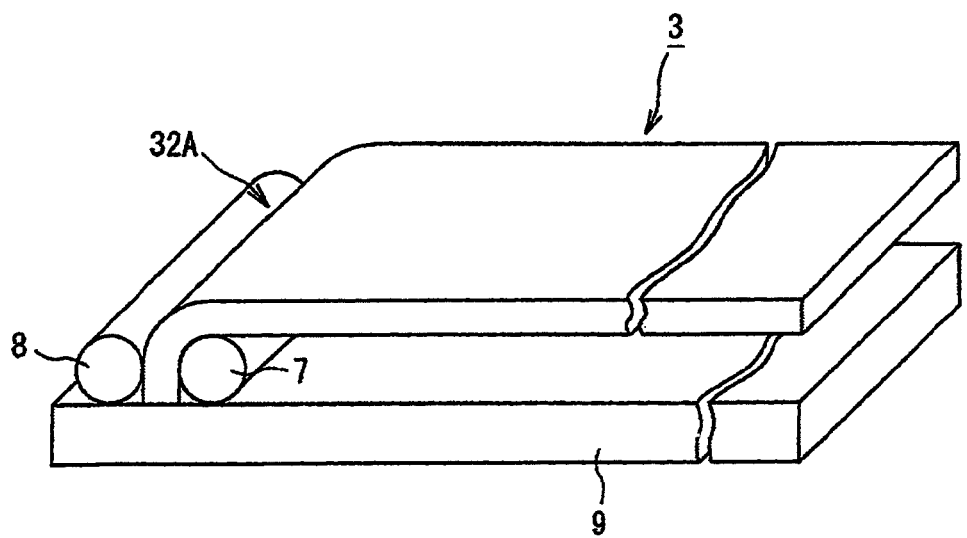

FIGS. 7A, 7B and 7C are diagrams relating to the formation of the bent portion in the fourth exemplary embodiment of the invention in which FIGS. 7A and 7B are side views, and FIG. 7C is a perspective view.

In the polymer optical waveguide film 3, as shown in FIG. 7A, the end portion is inserted between a heating member 7 and supporting member 8 which are disposed on a work table 9 correspondingly with the thickness of the polymer optical waveguide film 3.

The heating member 7 has a columnar shape of a radius of curvature of 0.5 to 5 mm, and internally has a member which generates heat by energization, such as a nichrome wire, so as to generate heat in the range of 100 to 200° C. or the glass transition temperature of the targeted polymer optical waveguide film 3. In FIG. 7C, the heating member 7 and the supporting member 8 have a columnar shape.

However, the shape is not restricted to this. The heating member 7 and the supporting member 8 can have any shape as far as the heat of the heating member 7 can be transmitted to the bent portion 32A of the polymer optical waveguide film 3.

While heated by the heating member 7, the polymer optical waveguide film 3 is bent in the direction of A in FIG. 7A to be deformed. When the polymer optical waveguide film 3 is returned to the room temperature, the shape of the bent portion 32A is held.

It is not necessary that the whole of the polymer optical waveguide film 3 is made of a thermoplastic resin. In the polymer optical waveguide film 3, a portion in a range from the end to a position which is separated by 10 mm from the end may be made of a thermoplastic resin. As a result, the mounting height in the case where the light emitting element 4A and the light receiving element 5A are connected to the polymer optical waveguide film 3 to be used can be lowered. As the thermoplastic resin, useful are an acrylic resin, an epoxy resin, and a polyolefin resin. Alternatively, the polymer optical waveguide film 3 may be made of a polyimide resin, and the portion in the range from the end to the position of 10 mm may be made of one of the above-mentioned thermoplastic resins.

(Light Emitting Element)

As the light emitting element 4A, for example, plural light emitting elements (planar optical elements) such as a planar light emitting diode or a planer laser can be used. In the exemplary embodiment, a VCSEL (planer laser) is used as the light emitting element 4A.

In the planer laser, for example, an n-type upper reflective layer, an active layer, a current constriction layer, a p-type lower reflective layer, a p-type contact layer, and a p-type electrode are formed on an n-type GaAs substrate, and an n-type electrode is formed on the front side of the n-type GaAs substrate.

The light emitting element 4A has a configuration where the pads 41, 22a are electrically connected to each other through a wire 23a, and the pad 22a is to be electrically connected to a circuit pattern of the electronic circuit substrate on which the submount 2A is to be mounted.

(Light Receiving Element)

As the light receiving element 5A, for example, a planar optical element such as a planar photodiode can be used. In the exemplary embodiment, a GaAs PIN photodiode which has a high responsibility is used as the light receiving element 5A.

For example, the light receiving element 5A comprises, on a GaAs substrate, P, I, and N layers which are joined by PIN junction, a p-type electrode which is connected to the P layer, and an n-type electrode which is connected to the N layer.

The light receiving element 5A has a configuration where the pads 51, 22b are electrically connected to each other through a wire 23b, and the pad 22b is to be electrically connected to a circuit pattern of the electronic circuit substrate on which the submount 2A is to be mounted.

As shown in FIG. 1B, a light receiving portion 50 of the light receiving element 5A is optically coupled to the first core 31a of the polymer optical waveguide film 3 via the transparent adhesive agent 6A, and a light emitting portion 40 of the light emitting element 4A is optically coupled to the second core 31b of the polymer optical waveguide film 3 via the transparent adhesive agent 6A.

(Mounting of Polymer Optical Waveguide Film)

In the polymer optical waveguide film 3 in which the bent portion 32A is formed as described above, the adhesive agent 6A is applied to a light input/output end which is on the side where the bent portion 32A is formed. Then, the adhesive agent 6B is applied to the fixing members 20c, 20d and the height-adjusting member 200. The light input/output end to which the adhesive agent 6A is applied is inserted between the fixing members 20a, 20d and 20b, 20c, and fixed to the submount 2A by the fixing members 20a to 20d and the height-adjusting member 200. After the fixation of the polymer optical waveguide film 3, the optical elements and the fixing members are sealed by a sealant.

Operation of Fourth Exemplary Embodiment

Hereinafter, the operation of the optical substrate of the fourth exemplary embodiment of the invention will be described with reference to FIGS. 1, 2, 6, and 7.

(Transmission and Reception of Optical Signal)

The light emitting element 4A of the submount 2A receives the driving signal that is used for driving the light emitting element 4A, and that is transmitted from the electronic circuit substrate on which the submount 2A is mounted, through the pad 22a, the wire 23a, and the pad 41. The light emitting element 4A outputs an optical signal based on the received driving signal, to cause the optical signal to propagate through the polymer optical waveguide film 3.

The direction of the optical path for the optical signal propagating through the polymer optical waveguide film 3 is changed by the core of the bent portion 32A from the direction perpendicular to the surface of the submount 2A to that parallel to the surface of the submount 2A. For example, the optical signal is received by a light receiving element (not shown) through an optical connector (not shown) disposed on the other end portion of the polymer optical waveguide film 3, to be converted to an electrical signal, and then transmitted to a predetermined electronic circuit.

Fifth Exemplary Embodiment

Figure 8:
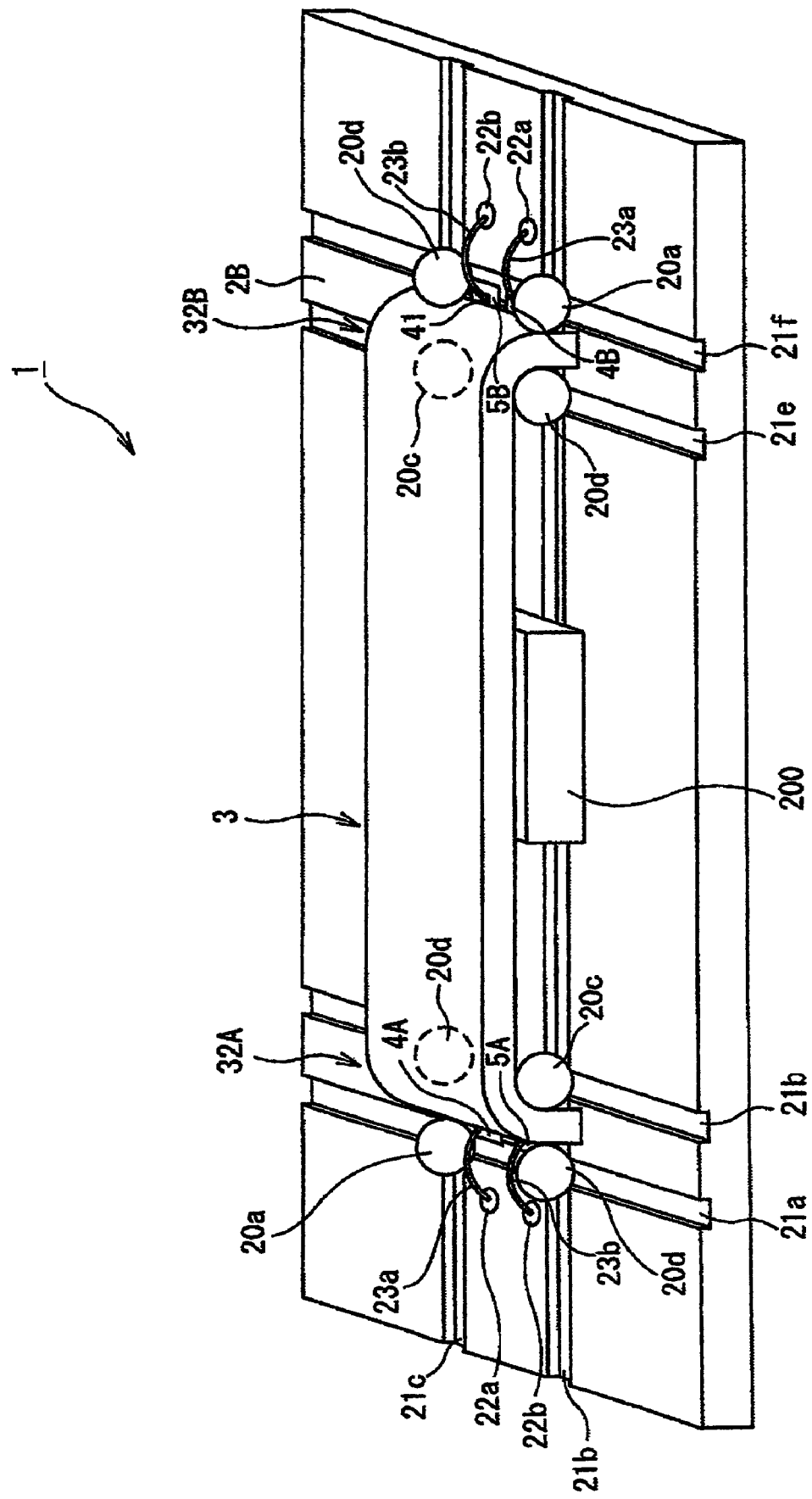
FIG. 8 is a perspective view of an optical substrate of a fifth exemplary embodiment of the invention.

FIG. 8 is a perspective view of an optical substrate of a fifth exemplary embodiment of the invention. In the following description, components having the same configuration and function as those of the fourth exemplary embodiment are denoted by the common reference numerals.

As compared with the fourth exemplary embodiment, the polymer optical waveguide film 3 further has a bent portion 32B. The bent portion 32B is formed by the same steps as those of the bent portion 32A in the fourth exemplary embodiment.

As compared with the fourth exemplary embodiment, furthermore, a submount 2B has U-grooves 21e, 21f. In the exemplary embodiment, a light emitting element 4B and a light receiving element 5B are added in a point-symmetrical manner with respect to the light emitting element 4A and the light receiving element 5A in the fourth exemplary embodiment. The height-adjusting member 200 supports the polymer optical waveguide film 3 in the middle.

(Mounting of Polymer Optical Waveguide Film)

In the polymer optical waveguide film 3 in which the bent portions 32A, 32B are formed as described above, the adhesive agent 6A is applied to the both ends. Then, the adhesive agent 6B is applied to the fixing members 20c, 20d on the both sides and the height-adjusting member 200. The ends of the polymer optical waveguide film 3 to which the adhesive agent 6A is applied are inserted between the fixing members 20*a*, 20*d* and 20*b*, 20*c* disposed on the both sides of the submount 2B, and fixed to the submount 2B by the fixing members 20*a* to 20*d* on the both sides of the submount 2B, and the height-adjusting member 200. After the fixation of the polymer optical waveguide film 3, the optical elements and the fixing members are sealed by a sealant.

(Transmission and Reception of Optical Signal)

The light emitting element 4A receives the driving signal that is transmitted from the electronic circuit substrate on which the submount 2B is mounted, through the pad 22*a*, the wire 23*a*, and the pad 41. The light emitting element 4A outputs an optical signal based on the received driving signal, to cause the optical signal to propagate through the polymer optical waveguide film 3.

The direction of the optical path for the optical signal propagating through the polymer optical waveguide film 3 is changed by the bent portion 32A from the direction perpendicular to the surface of the submount 2B to that parallel to the surface of the submount 2B. The optical signal propagates through the polymer optical waveguide film 3, and the direction of the optical path is changed by the bent portion 32B from the direction parallel to the surface of the submount 2B to that perpendicular to the surface of the submount 2B.

The optical signal in which the direction of the optical path is changed is received by a light receiving element (not shown) of the light receiving element 5B, to be converted to an electrical signal, and then the converted electrical signal is transmitted to a predetermined electronic circuit through the pad 51, the wire 23, and the pad 22*b*.

Sixth Exemplary Embodiment

Figure 9A:
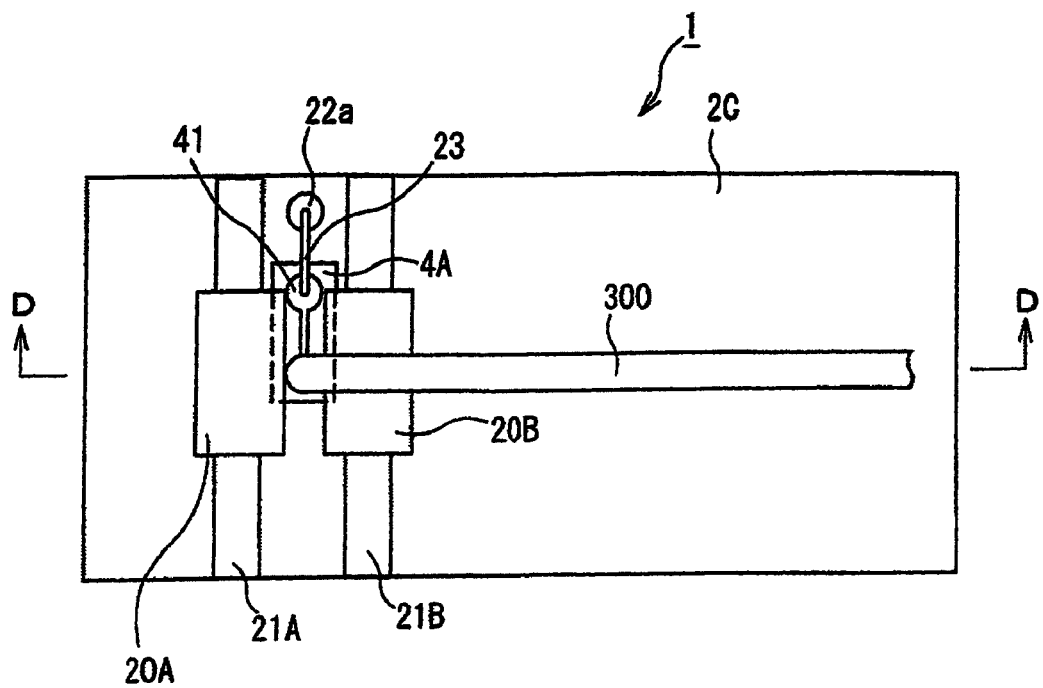
FIG. 9A is a plan view of an optical substrate of a sixth exemplary embodiment of the invention.
Figure 9B:
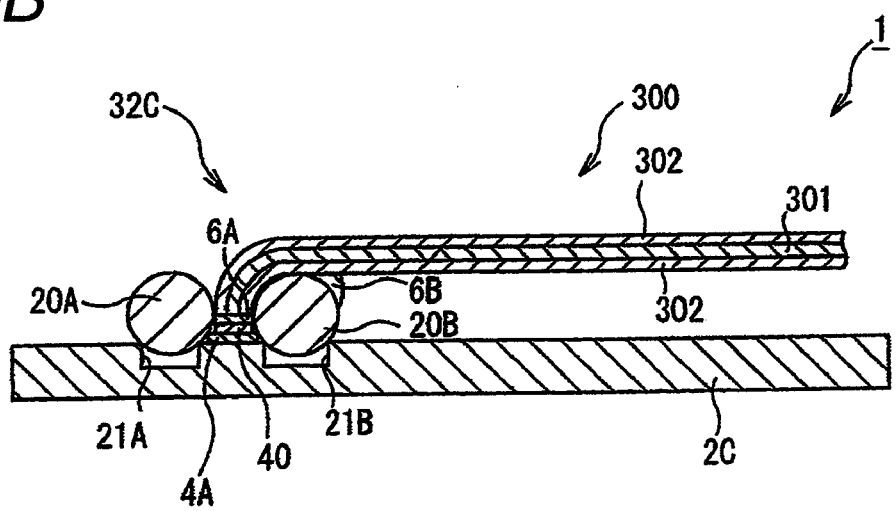
FIG. 9B is a section view taken along the line D-D in FIG. 9A.

FIGS. 9A and 9B are diagrams of an optical substrate of a sixth exemplary embodiment of the invention in which FIG. 9A is a plan view, and FIG. 9B is a section view taken along the line D-D in FIG. 9A.

The optical substrate 1 has a submount 2C which is to be mounted on an electronic circuit substrate (not shown) including various electronic components, components of a power source circuit, etc. A light emitting element 4A which converts a driving signal transmitted from an electronic component on the electronic circuit substrate, to output an optical signal, fixing members 20A, 20B having, for example, a columnar shape, and an optical fiber 300 are placed on the submount 2C.

(Submount)

The submount 2C has a rectangular shape, and comprises U-grooves 21A, 21B which are formed in a U-like shape in the upper face.

The optical fiber 300 is made of the same materials as the polymer optical waveguide film 3 in the fourth exemplary embodiment. The optical fiber is configured by a core 301 having a circular section shape, and a clad 302 which is formed around the core 301.

The bent portion 32C of the optical fiber 300 is formed by the same steps as those of the bent portion 32A of the polymer optical waveguide film 3 in the fourth exemplary embodiment.

(Mounting of Optical Fiber)

In the optical fiber 300, the adhesive agent 6A is applied to the light input/output end which is on the side of the bent portion 32C. Then, the adhesive agent 6B is applied to the fixing member 20B. The light input/output end of the optical fiber 300 to which the adhesive agent 6A is applied is inserted between the fixing members 20A, 20B, and fixed to the submount 2C by the fixing members 20A, 20B. After the fixation of the optical fiber 300, the optical element 4A and the fixing members are sealed by a sealant.

(Transmission and Reception of Optical Signal)

The light emitting element 4A disposed on the submount 2C receives the driving signal transmitted from the electronic circuit substrate on which the submount 2C is mounted, through a pad 22*a*, a wire 23*a*, and a pad 41. The light emitting element 4A outputs an optical signal based on the received driving signal, to cause the optical signal to propagate through the optical fiber 300.

The direction of the optical path for the optical signal propagating through the optical fiber 300 is changed by the bent portion 32C from the direction perpendicular to the surface of the submount 2C to that parallel to the surface of the submount 2C. The optical signal is received by a light receiving element (not shown) through an optical connector (not shown) disposed on the other end portion of the optical fiber 300, to be converted to an electrical signal, and then transmitted to a predetermined electronic circuit.

Example 1

Example 1 corresponding to the first exemplary embodiment of the invention will be described.

(Production of Polymer Optical Waveguide Film)

The cores of the polymer optical waveguide film 3 are produced with using an epoxy film (thickness: 50 μm, refractive index: 1.57, glass transition temperature: 120° C.) which has flexibility and a high refractive index.

Then, an acrylic UV-curable resin (glass transition temperature: 120° C.) having a refractive index of 1.51 is applied (thickness: 20 μm) to the both faces of the cores. The acrylic UV-curable resin is irradiated with UV rays to be cured, thereby producing a three-layer film.

The produced three-layer film is cut from a side face by a dicing saw with an accuracy of 75 μm±5 μm from the upper face. Next, the dicing saw is moved by 50 μm in a direction perpendicular to the optical axis, and further moved by 450 μm from the moved position to perform a cutting operation.

Then, the dicing saw is moved by 50 μm in a direction perpendicular to the optical axis, and a cutting operation is performed with starting from the moved position, so that a two-core optical waveguide core having a core diameter of 50 μm and a width of 500 μm is formed. An acrylic UV-curable resin having a refractive index of 1.51 is applied so as to bury cut recesses. The acrylic UV-curable resin is irradiated with UV rays to be cured. The cured two-core optical waveguide core is cut by a dicing saw, and the predetermined polymer optical waveguide film 3 is obtained.

(Submount)

The grooves 21*a* to 21*d* are produced in a Si wafer having a thickness of 500 μm, with using a dicing saw having a thickness of 300 μm. The cutting operation is performed so that the grooves 21*a* to 21*d* have a width of 300 μm and a depth of 300 μm. The interval between the grooves 21*a*, 21*b* is 300 μm, and that between the grooves 21*c*, 21*d* is 450 μm.

(Light Emitting Element and Light Receiving Element)

A VCSEL element is used as the light emitting element 4A, and a photodiode is used as the light receiving element 5A. The elements 4A, 5A are mounted with using a flip chip bonder between the grooves 21*c*, 21*d* of the submount 2A so that the distance between the elements is 250 μm.

(Mounting of Polymer Optical Waveguide Film)

In order to suppress the optical loss, a UV-curable resin which is the same material as the first and second cores 31a, 31b is applied to the light input/output end of the polymer optical waveguide film 3 which is on the side of mounting. As shown in FIGS. 1A, 1B and 1C, the light input/output end to which the UV-curable resin is applied is inserted between the fixing members 20a, 20b and 20c, 20d. Positioning is performed by passive alignment so that the end faces of the first and second cores 31a, 31b are aligned with the light emitting portion 40 of the light emitting element 4A and the light receiving portion 50 of the light receiving element 5A. Then, the polymer optical waveguide film 3 is bent while being contacted with parts of the surfaces of the fixing members 20c, 20d, and fixed by the fixing members 20c, 20d and the height-adjusting member 200. Glass beads having a diameter of 350 μm are used as the fixing members 20a to 20d. Thereafter, the optical elements 4A, 5A and the fixing members 20a to 20d are sealed by a sealant, and fixed.

As a result of the above, the optical substrate 1 having a performance which is substantially identical with that of the optical substrate 1 of the first exemplary embodiment is obtained.

Example 2

Example 2 corresponding to the first exemplary embodiment of the invention will be described.

(Production of Polymer Optical Waveguide Film)

A Si substrate is coated with a thick-film resist (SU-8 manufactured by MicroCem Corp.) by the spin coat method. Thereafter, the substrate is prebaked at 80° C., exposed through a photomask, and subjected to a developing process, thereby forming two projections (width: 50 μm, height: 50 μm, length: 80 mm) having a square section. The interval between the projections is 250 μm. Next, the substrate is postbaked at 120° C. to produce a master plate for producing a polymer optical waveguide film.

Then, a release agent is applied to the master plate, and a mixture of a heat-curable liquid dimethyl siloxane rubber (SYLGARD 184 manufactured by Dow Corning Asia Co., viscosity: 5,000 mPa·s) and a curing agent for the rubber is poured onto the master plate. After heated at 120° C. for 30 minutes to be cured, the curved rubber is separated to produce a die (thickness: 5 mm) having recesses corresponding the projections in which the section is square.

Then, through holes are formed by punching in the one and other ends of each of the recesses so as to communicate with the recess, thereby forming a mold. A section shape of the through hole along the thickness direction of the mold in which the shape in plan view is circular.

The mold is closely contacted with a clad-forming film substrate (Arton film manufactured by JSR Corp., refractive index: 1.510) having a thickness of 20 μm and a size which is slightly larger than the mold. Then, several droplets of a UV-curable resin having a viscosity of 500 mPa·s are supplied through the inlet through hole of the mold, and vacuum-suction is performed through the discharge (vacuum-suction) through hole, so that the recesses are filled with the UV-curable resin in 10 minutes. Next, the mold is irradiated from the upper side with UV rays of 50 mW/cm² for 5 minutes to cure the UV-curable resin. The mold is separated from the Arton film, and cores having the same shape as the projections of the master plate are formed on the Arton film.

Next, a UV-curable resin in which the refractive index after cured is 1.510 or identical with that of the Arton film is applied to the core-formed face of the Arton film, and then a clad-forming film substrate of 20 μm is applied. The resin is UV-cured while being irradiated with UV rays of 50 mW/cm² for 5 minutes, thereby causing the two films to be bonded together. As a result, the polymer optical waveguide film 3 having a film-like shape having a width of 1.5 mm and a thickness 90 μm is obtained.

With using a dicing saw, then, the both ends of the polymer optical waveguide film are cut at 90 degrees to the optical axis, thereby obtaining the polymer optical waveguide film 3.

As a result of the above, the optical substrate 1 having a performance which is substantially identical with that of the optical substrate 1 of the first exemplary embodiment is obtained.

Example 3

Example 3 corresponding to the fourth exemplary embodiment of the invention will be described.

(Production of Polymer Optical Waveguide Film)

The cores of the polymer optical waveguide film 3 are produced with using an epoxy film (thickness: 50 μm, refractive index: 1.57, glass transition temperature: 120° C.) which has a high refractive index.

Then, an acrylic UV-curable resin (glass transition temperature: 120° C.) having a refractive index of 1.51 is applied (thickness: 20 μm) to the both faces of the cores. The acrylic UV-curable resin is irradiated with UV rays to be cured, thereby producing a three-layer film.

The produced three-layer film is cut form a side face by a dicing saw with an accuracy of 75 μm±5 μm from the upper face. Next, the dicing saw is moved by 50 μm in a direction perpendicular to the optical axis, and further moved by 450 μm from the moved position to perform a cutting operation.

Then, the dicing saw is moved by 50 μm in a direction perpendicular to the optical axis, and a cutting operation is performed with starting from the moved position. A two-core optical waveguide core having a core diameter of 50 μm and a width of 500 μm is formed. An acrylic UV-curable resin having a refractive index of 1.51 is applied so as to bury cut recesses. The acrylic UV-curable resin is irradiated with UV rays to be cured. The cured two-core optical waveguide core is cut by a dicing saw, and the predetermined polymer optical waveguide film 3 is obtained.

(Submount)

The U-grooves 21a to 21d having a depth of 300 μm are produced in a Si wafer having a thickness of 500 μm, with using a dicing saw having a thickness of 300 μm. Then, Glass beads having a diameter of 350 μm are buried at positions where the U-grooves 21a to 21d intersect with each other.

(Light Emitting Element and Light Receiving Element)

A VCSEL element is used as the light emitting element 4A, and a photodiode is used as the light receiving element 5A. The elements are mounted with using a flip chip bonder at predetermined positions of the submount 2A.

(Mounting of Polymer Optical Waveguide Film)

In order to suppress the optical loss, a UV-curable resin which is the same material as the first and second cores 31a, 31b is applied to the light input/output end of the polymer optical waveguide film 3 which is on the side of the bent portion 32A. As shown in FIGS. 1A, 1B and 1C, the one end portion is inserted between the fixing members 20a, 20b and 20c, 20d. Positioning is performed by passive alignment so that the end faces of the first and second cores 31a, 31b are aligned with the light emitting portion 40 of the light emitting element 4A and the light receiving portion 50 of the light receiving element 5A. Glass beads having a diameter of 350 µm are used as the fixing members 20a to 20d. Thereafter, the optical elements and the fixing members are sealed by a sealant, and fixed.

As a result of the above, the polymer optical waveguide film 3 is obtained in which the cores are configured by the epoxy film (thickness: 50 µm, refractive index: 1.57, glass transition temperature: 120° C.), and the clad is configured by the acrylic UV-curable resin (thickness: 20 µm, refractive index: 1.51, glass transition temperature: 120° C.).

Example 4

Example 4 corresponding to the fourth exemplary embodiment of the invention will be described.

(Production of Polymer Optical Waveguide Film)
A Si substrate is coated with a thick-film resist (SU-8 manufactured by MicroCem Corp.) by the spin coat method. Thereafter, the substrate is prebaked at 80° C., exposed through a photomask, and subjected to a developing process, thereby forming two projections (width: 50 µm, height: 50 µm, length: 80 mm) having a square section. The interval between the projections is 250 µm. Next, the substrate is postbaked at 120° C. to produce a master plate for producing a polymer optical waveguide film.

Then, a release agent is applied to the master plate, and a mixture of a heat-curable liquid dimethyl siloxane rubber (SYLGARD 184 manufactured by Dow Corning Asia Co., viscosity: 5,000 mPa·s) and a curing agent for the rubber is poured onto the master plate. After heated at 120° C. for 30 minutes to be cured, the cured rubber is separated to produce a die (thickness: 5 mm) having recesses corresponding the projections in which the section is square.

Then, through holes are formed by punching in the one and other ends of each of the recesses so as to communicate with the recess, thereby forming a mold. A section shape of the through hole along the thickness direction of the mold in which the shape in plan view is circular.

The mold is closely contacted with a clad-forming film substrate (Arton film manufactured by JSR Corp., refractive index: 1.510) having a thickness of 20 µm and a size which is slightly larger than the mold. Then, several droplets of a UV-curable resin having a viscosity of 500 mPa·s are supplied through the inlet through hole of the mold, and vacuum-suction is performed through the discharge (vacuum-suction) through hole, so that the recesses are filled with the UV-curable resin in 10 minutes. Next, the mold is irradiated from the upper side with UV rays of 50 mW/cm² for 5 minutes to cure the UV-curable resin. The mold is separated from the Arton film, and cores having the same shape as the projections of the master plate are formed on the Arton film.

Next, a UV-curable resin in which the refractive index after cured is 1.510 or identical with that of the Arton film is applied to the core-formed face of the Arton film, and then a clad-forming film substrate of 20 µm is applied. The resin is UV-cured while being irradiated with UV rays of 50 mW/cm² for 5 minutes, thereby causing the two films to be bonded together. As a result, the polymer optical waveguide film 3 having a film-like shape having a width of 1.5 mm and a thickness 90 µm is obtained.

With using a dicing saw, then, the both ends of the polymer optical waveguide film are cut at 90 degrees to the optical axis, thereby obtaining the polymer optical waveguide film 3.

As a result of the above, the polymer optical waveguide film 3 is obtained in which the cores are 50 µm (refractive index: 1.560, glass transition temperature: 130° C.), and the clad is 20 µm (refractive index: 1.510, glass transition temperature: 171° C.).

The invention is not restricted to the exemplary embodiments and the examples, and can be variously modified without departing or changing the technical concept of the invention.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An optical substrate comprising:
   a submount having a flat plate shape;
   a planar light emitting element which is mounted on the submount and which emits light to a direction perpendicular to a surface of the submount;
   a pair of positioning members which are disposed at an interval across the light emitting element on the submount;
   an optical waveguide in which a core and a clad are formed by a flexible material; and
   a holding member which holds the optical waveguide such that a tip end of the optical waveguide is inserted between the pair of positioning members, and the optical waveguide is bent and extends parallel to the surface of the submount.

2. The optical substrate according to claim 1, wherein a groove is disposed in the submount, and the pair of positioning members are placed in the groove.

3. The optical substrate according to claim 1, wherein a plurality of grooves are disposed in an intersecting manner in the submount, and the pair of positioning members are placed at intersections of the plurality of grooves.

4. The optical substrate according to claim 1, wherein the pair of positioning members are spherical or cylindrical.

5. The optical substrate according to claim 1, wherein the optical waveguide is in contact with a part of a surface of one of the pair of positioning members.

6. The optical substrate according to claim 1, wherein the core has a rectangular section shape.

7. The optical substrate according to claim 1, wherein the core has a circular section shape.

8. The optical substrate according to claim 1, wherein the submount has a pair of grooves provided on the surface of the submount,
   the planar light emitting element is mounted between the pair of grooves and
   the pair of positioning members are disposed in the pair of grooves.

9. The optical substrate according to claim 1, wherein the optical waveguide is bent such that the optical waveguide adjacent to the tip end extends perpendicular to the surface of the submount.

* * * * *